(12) United States Patent
Park

(10) Patent No.: US 10,953,832 B2
(45) Date of Patent: Mar. 23, 2021

(54) AIRBAG DEVICE FOR SEAT BELT

(71) Applicant: Hyundai Mobis Co., Ltd., Seoul (KR)

(72) Inventor: Hae Kwon Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 85 days.

(21) Appl. No.: 16/352,412

(22) Filed: Mar. 13, 2019

(65) Prior Publication Data
US 2019/0283699 A1   Sep. 19, 2019

(30) Foreign Application Priority Data

Mar. 16, 2018 (KR) .......................... 10-2018-0030756

(51) Int. Cl.
*B60R 21/18* (2006.01)
*B60R 22/46* (2006.01)
*B60R 22/00* (2006.01)
*B60R 21/207* (2006.01)

(52) U.S. Cl.
CPC ............ *B60R 21/18* (2013.01); *B60R 21/207* (2013.01); *B60R 22/00* (2013.01); *B60R 22/46* (2013.01)

(58) Field of Classification Search
CPC ....... B60R 21/207; B60R 22/00; B60R 21/18; B60R 22/04
USPC ......................................................... 280/733
See application file for complete search history.

(56) References Cited

U.S. PATENT DOCUMENTS

| 6,382,666 B1 * | 5/2002 | Devonport | B60R 21/18 280/730.1 |
| 6,890,000 B2 * | 5/2005 | Taubenberger | B60R 21/18 280/730.2 |
| 8,016,318 B2 * | 9/2011 | Nezaki | B60N 2/688 280/733 |

* cited by examiner

*Primary Examiner* — Toan C To
(74) *Attorney, Agent, or Firm* — H.C. Park & Associates, PLC

(57) ABSTRACT

An airbag device for a seat belt may include: a seat supporting a passenger; an inflator embedded in the seat; a cover mounted on the seat and exposed to the outside; a belt passed through the cover so as to cover the passenger; and a cushion stored in the cover, and deployed by gas supplied from the inflator so as to cover the belt.

6 Claims, 7 Drawing Sheets

AIRBAG DEVICE FOR SEAT BELT

CROSS-REFERENCES TO RELATED APPLICATIONS

The present application claims priority from and the benefit of Korean application number 10-2018-0030756, filed on Mar. 16, 2018, which is incorporated herein by reference in its entirety.

BACKGROUND

Field

The present invention relates to an airbag device for a seat belt, and more particularly, to an airbag device for a seat belt, which can reduce a chest injury of a passenger due to the pressure of a belt.

Discussion of the Background

In general, an airbag device refers to a device which deploys a cushion by injecting gas into the cushion, when a collision occurs during driving. The airbag device serves to protect a passenger together with a seat belt.

The seat belt is mounted on a passenger's seat, and constrains a passenger against a collision in front, thereby preventing the passenger from being thrown out of a vehicle. Such a seat belt holds the shoulder and waist of the passenger using a string called webbing.

In the related art, when a vehicle collision occurs, the webbing is automatically wound to protect the passenger. However, the webbing may pressurize the chest of the passenger, thereby causing an injury of the passenger. Therefore, there is a demand for a device capable of solving the problem.

SUMMARY

Embodiments of the present invention are directed to an airbag device for a seat belt, which can reduce a chest injury of a passenger due to the pressure of a belt.

In one embodiment, an airbag device for a seat belt may include: a seat supporting a passenger; an inflator embedded in the seat; a cover mounted on the seat and exposed to the outside; a belt passed through the cover so as to cover the passenger; and a cushion stored in the cover, and deployed by gas supplied from the inflator so as to cover the belt.

The cover may include: a cover coupling part coupled to the top of the seat; and a cover induction part extended from the cover coupling part, and having the cushion embedded therein.

The cover induction part may have a duct shape to protrude forward, and induce the cushion to deploy straight.

The belt may include: a belt guide part formed in the cover; a belt webbing part passed through the belt guide part so as to cover the passenger; and a belt adjusting part winding or unwinding the belt webbing part.

The cushion may include: a cushion base part embedded in the cover, and coupled to the inflator; and a cushion deployment part coupled to the cushion base part, and covering the belt webbing part while expanded and deployed by gas supplied from the inflator.

The cushion deployment part may include: a deployment top surface part communicating with the cushion base part, and covering a top surface of the belt webbing part; a deployment bottom surface part communicating with the cushion base part, and covering a bottom surface of the belt webbing part; and a deployment side surface part connecting the deployment top surface part and the deployment bottom surface part, and covering a side surface of the belt webbing part.

After the cushion deployment part is deployed by the inflator, the belt adjusting part may be driven to wind the belt webbing part.

In the airbag device for a seat belt in accordance with the embodiment of the present invention, the cushion may be deployed to cover the belt, thereby preventing an injury of the passenger which may be caused by the belt when a vehicle collision occurs.

In the airbag device for a seat belt in accordance with the embodiment of the present invention, the cover induction part may protrude forward and induce the cushion part to deploy straight.

In the airbag device for a seat belt in accordance with the embodiment of the present invention, when the inflator is operated to completely deploy the cushion deployment part, the belt adjusting part may be operated so that the belt webbing part pressurizes a passenger.

DETAILED DESCRIPTION OF THE ILLUSTRATED EMBODIMENTS

Hereafter, an airbag device for a seat belt in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
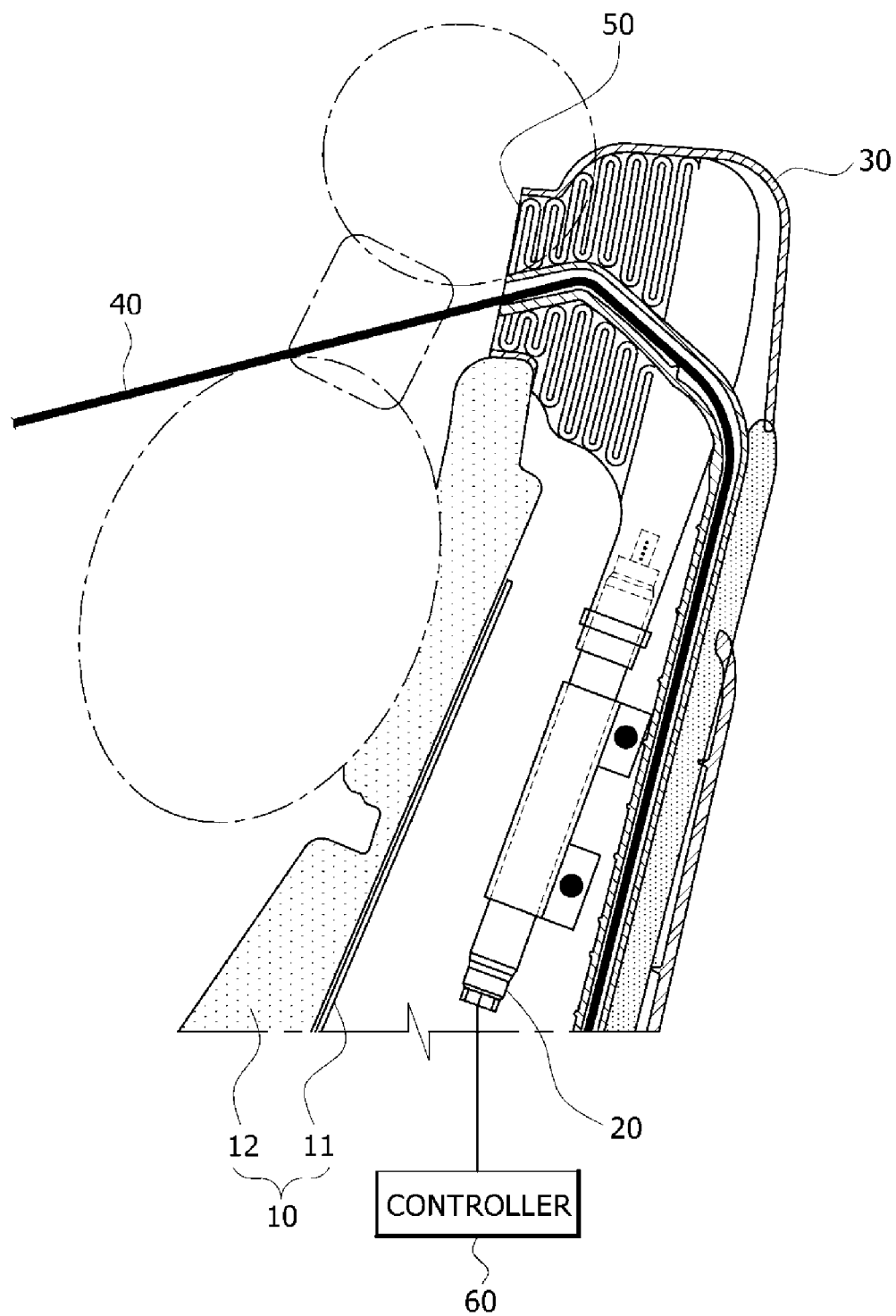
FIG. 1 is a cross-sectional view schematically illustrating a state before a cushion is deployed in an airbag device for a seat belt in accordance with an embodiment of the present invention.
Figure 2:
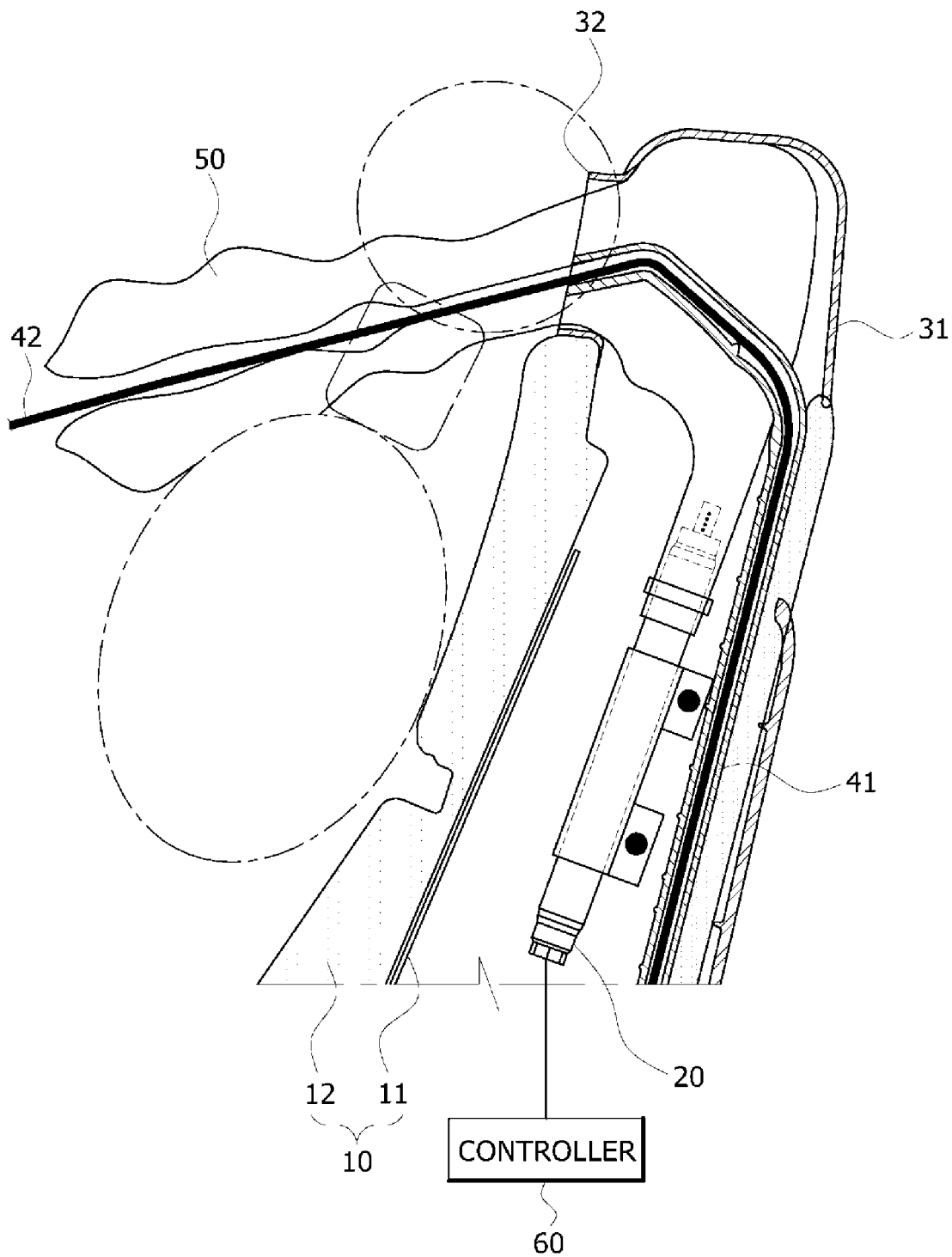
FIG. 2 schematically illustrates that the cushion of FIG. 1 is deployed.
Figure 3:
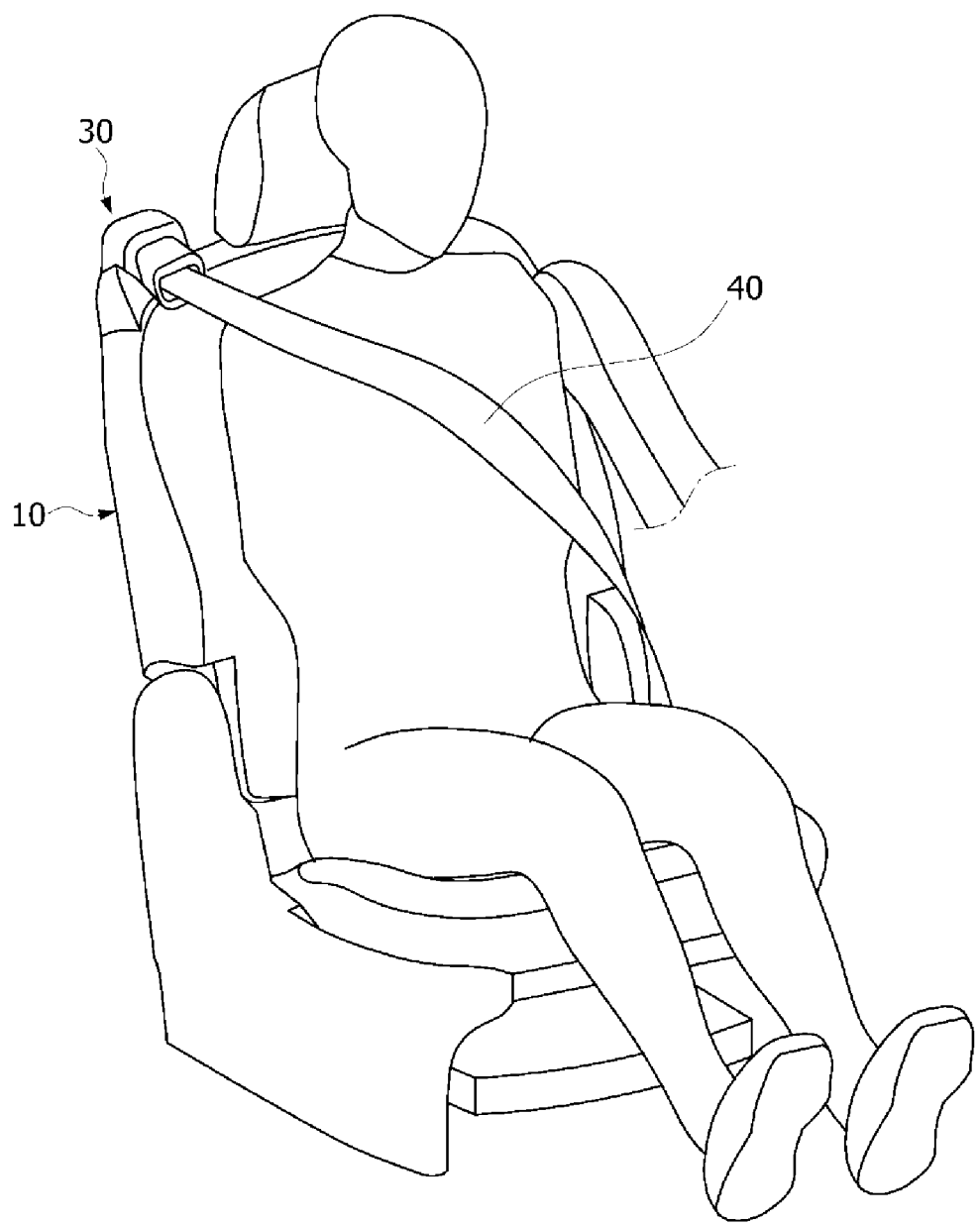
FIG. 3 schematically illustrates that a belt protects a passenger before the cushion is deployed in the airbag device for a seat belt in accordance with the embodiment of the present invention.
Figure 4:
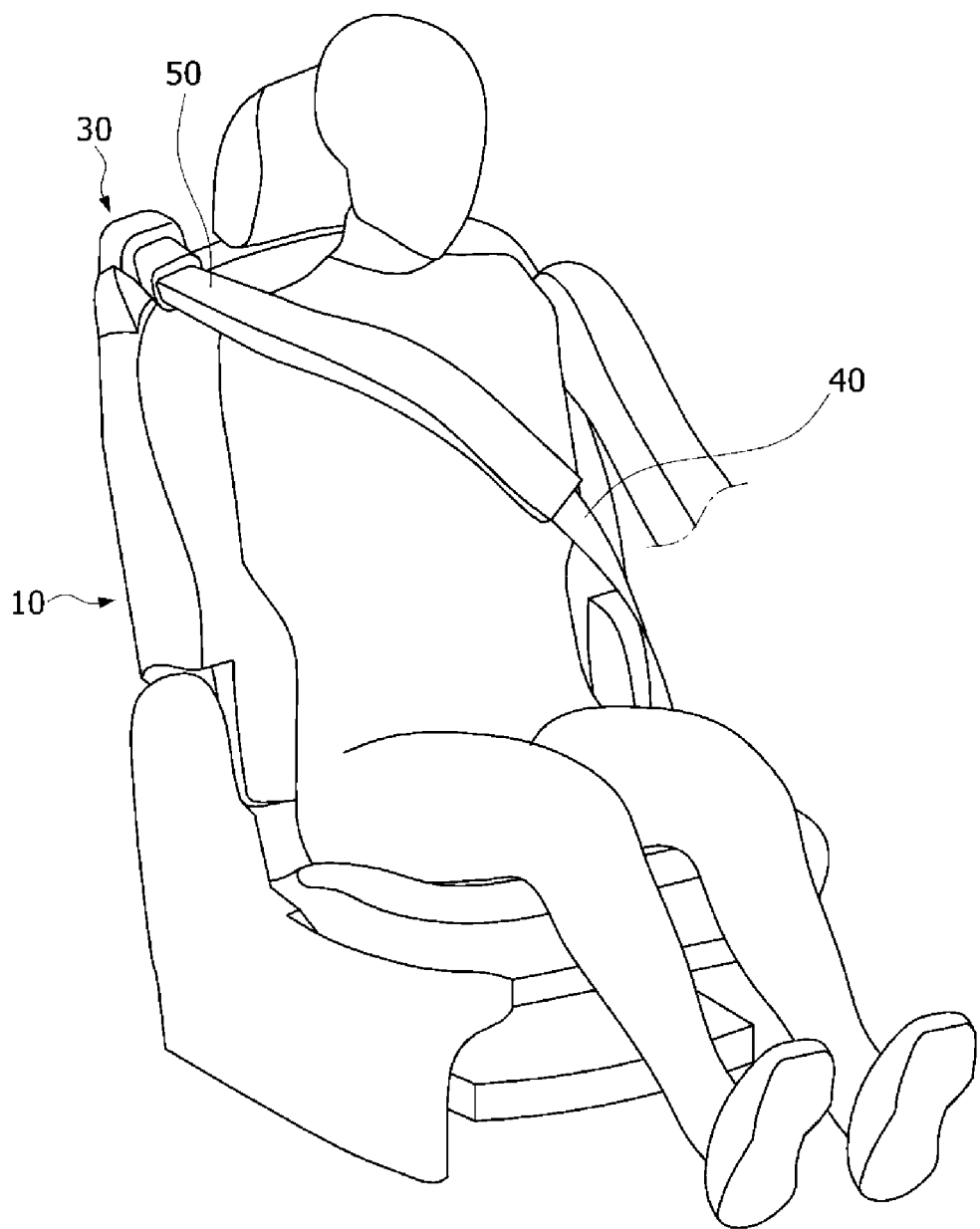
FIG. 4 schematically illustrates that the cushion of FIG. 3 is deployed.

FIG. 1 is a cross-sectional view schematically illustrating a state before a cushion is deployed in an airbag device for a seat belt in accordance with an embodiment of the present invention, and FIG. 2 schematically illustrates that the cushion of FIG. 1 is deployed. FIG. 3 schematically illustrates that a belt protects a passenger before the cushion is deployed in the airbag device for a seat belt in accordance with the embodiment of the present invention, and FIG. 4 schematically illustrates that the cushion of FIG. 3 is deployed. Referring to FIGS. 1 to 4, the airbag device 1 for a seat belt in accordance with the embodiment of the present invention may include a seat 10, an inflator 20, a cover 30, a belt 40 and a cushion 50.

The seat 10 may support a passenger. For example, the seat 10 may include a seat frame 11 which is mounted on a vehicle body and a seat cushion 12 which covers the outside of the seat frame 11 and makes the passenger feel that the passenger is sitting.

The inflator 20 may be embedded in the seat 10. For example, the inflator 20 may be mounted on the seat frame 11, and exploded to discharge gas under control of a controller 60. The vehicle body may include one or more collision sensors to sense whether a vehicle collision occurs, and the controller 60 receiving a sensing signal from a collision sensor may control the inflator 20 to operate.

The cover 30 may be mounted on the seat 10 and exposed to the outside. For example, the cover 30 may be coupled to the seat frame 11, and disposed outside the region of the seat cushion 12 so as to be exposed to the outside.

The belt 40 may be passed through the cover 30 so as to cover the passenger. For example, one end of the belt 40 may be mounted on the seat frame 11, and the other of the belt 40 may be passed through the cover 30 and detachably clip-coupled to the seat frame 11.

The cushion 50 may be stored in the cover 30, and deployed by gas supplied from the inflator 20 so as to cover the belt 40. For example, the cushion 50 may be embedded in the cover 30 before the inflator 20 is operated, inflated by the gas supplied from the inflator 20 when the inflator 20 is operated, and exposed to the outside from the cover 30. At this time, the cushion 50 may be guided by the belt 40 and deployed to cover the belt 40, thereby preventing an injury of the passenger due to the pressure of the belt 40.

Figure 5:
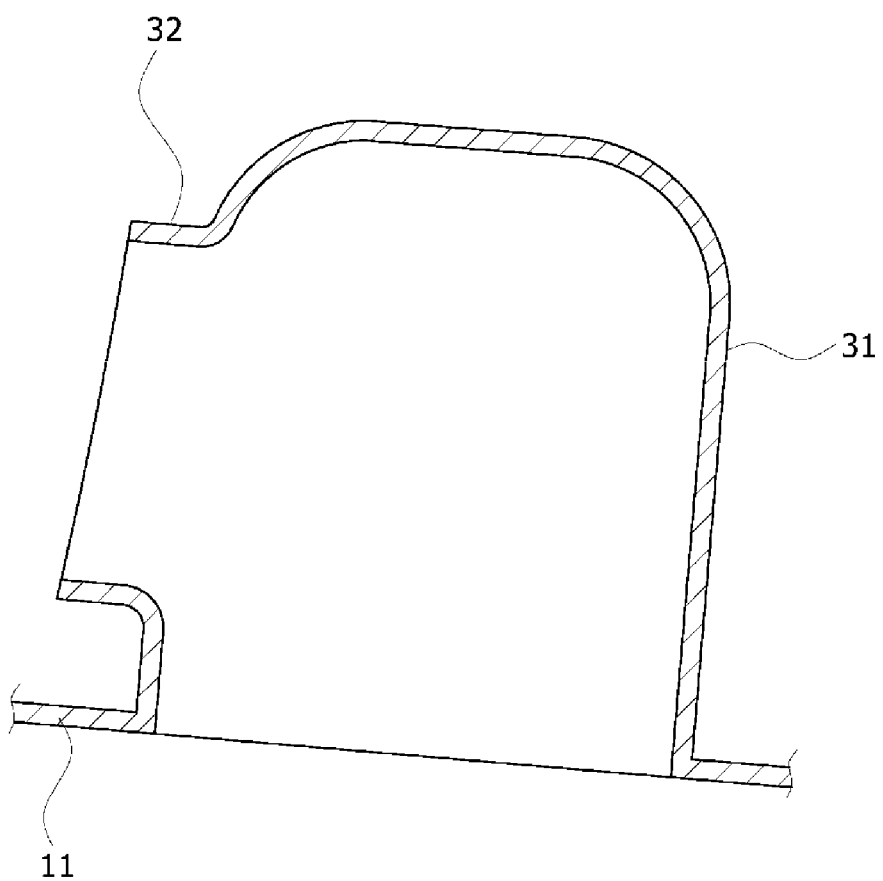
FIG. 5 schematically illustrates a cover of the airbag device for a seat belt in accordance with the embodiment of the present invention.

FIG. 5 schematically illustrates the cover of the airbag device for a seat belt in accordance with the embodiment of the present invention. Referring to FIG. 5, the cover 30 in accordance with the embodiment of the present invention may include a cover coupling part 31 and a cover induction part 32.

The cover coupling part 31 may be coupled to the top of the seat 10. For example, the cover coupling part 31 may be coupled to the top of the seat frame 11 so as to extend upwardly, and formed in a duct shape to guide the belt 40.

The cover induction part 32 may be extended from the cover coupling part 31, and have the cushion 50 embedded therein. For example, the cover induction part 32 may have a duct shape to protrude forward from the cover coupling part 31, and not only guide the belt 40, but also induce the cushion 50 to deploy straight.

Figure 6:
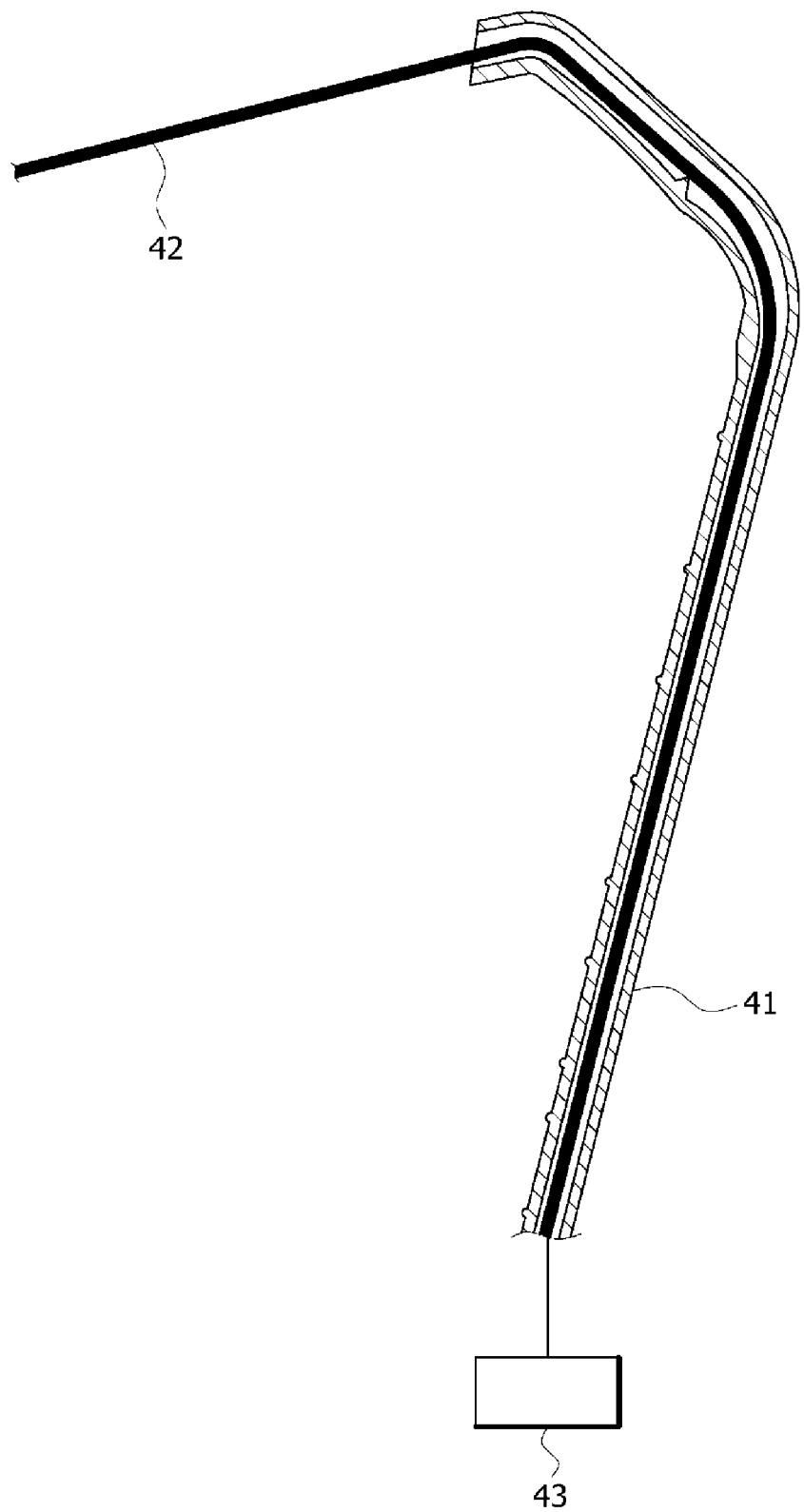
FIG. 6 schematically illustrates the belt of the airbag device for a seat belt in accordance with the embodiment of the present invention.

FIG. 6 schematically illustrates the belt of the airbag device for a seat belt in accordance with the embodiment of the present invention. Referring to FIG. 6, the belt 40 in accordance with the embodiment of the present invention may include a belt guide part 41, a belt webbing part 42 and a belt adjusting part 43.

The belt guide part 41 may be formed in the cover 30. For example, the belt guide part 41 may be formed of a metallic material having considerable stiffness, and have one end fixed to the seat frame 11 and the other end disposed at the cover 30. Such a belt guide part 41 may have a pipe shape. The belt guide part 41 may be fixed to the cover 30, or formed through the cushion 50.

The belt webbing part 42 may be passed through the belt guide part 41 so as to cover the passenger. For example, the belt webbing part 42 may be coupled to the bottom of the seat 10 and wound or unwound, and a separate clip may be mounted on the belt webbing part 42 and attached to or detached from a buckle mounted on the seat 10.

The belt adjusting part 43 may wind or unwind the belt webbing part 42. For example, the belt adjusting part 43 may be mounted on the seat frame 11, and connected to an end of the belt webbing part 42 to wind or unwind the belt webbing part 42. In particular, when a vehicle collision occurs, the belt adjusting part 43 may wind the belt webbing part 42 under control of the controller 60, thereby restricting a passenger from moving forward.

Figure 7:
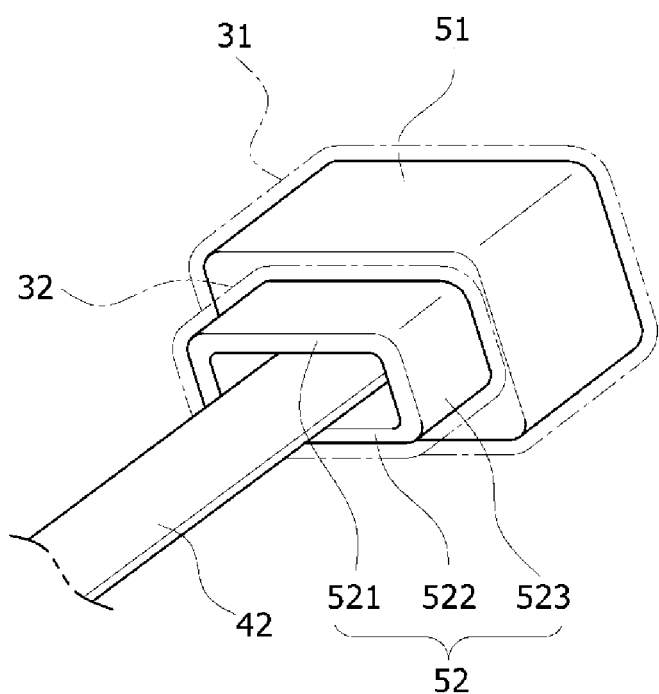
FIG. 7 schematically illustrates the cushion of the airbag device for a seat belt in accordance with the embodiment of the present invention.

FIG. 7 schematically illustrates the cushion of the airbag device for a seat belt in accordance with the embodiment of the present invention. Referring to FIG. 7, the cushion 50 in accordance with the embodiment of the present invention may include a cushion base part 51 and a cushion deployment part 52.

The cushion base part 51 may be embedded in the cover 30, and connected to the inflator 20. For example, the cushion base part 51 may be embedded in the cover coupling part 31, and connected to the inflator 20 so as to guide gas supplied from the inflator 20. At this time, the belt guide part 41 may be passed through the cushion base part 51 or disposed adjacent to the cushion base part 51.

The cushion deployment part 52 may be connected to the cushion base part 51, and cover the belt webbing part 42 while expanded and deployed by gas supplied from the inflator 20. The cushion deployment part 52 may be disposed between the belt webbing part 42 and a passenger, and prevent an injury of the passenger. For example, the cushion deployment part 52 may be folded and embedded in the cover induction part 32 before deployed. When the cushion deployment part 52 is deployed, the cushion deployment part 52 may be discharged from the cover induction part 32 and cover the belt webbing part 42. At this time, the folded portions of the cushion deployment part 52 may be temporarily coupled to each other through a sewing operation. When the cushion deployment part 52 is deployed, the sewed portions may be broken by gas pressure.

The cushion deployment part 52 in accordance with the embodiment of the present invention may include a deployment top surface part 521, a deployment bottom surface part 522 and a deployment side surface part 523.

The deployment top surface part 521 may communicate with the cushion base part 51 and cover the top surface of the belt webbing part 42. The deployment bottom surface part 522 may communicate with the cushion base part 51 and cover the bottom surface of the belt webbing part 42. The deployment side surface part 523 may connect the deployment top surface part 521 and the deployment bottom surface part 522, and cover the side surface of the belt webbing part 42. For example, the deployment top surface part 521, the deployment bottom surface part 522 and the deployment side surface part 523 may form a belt shape having a rectangular cross-section, such that the belt webbing part 42 can pass through the cushion deployment part 52.

After the cushion deployment part 52 is deployed by the inflator 20, the belt adjusting part 43 may be driven to wind the belt webbing part 42. For example, the controller 60 receiving a sensing signal of the collision sensor may first operate the inflator 20, and operate the belt adjusting part 43 after a preset time elapses. At this time, the preset time may indicate a time required for completely deploying the cushion deployment part 52 to cover the belt webbing part 42.

The operation of the airbag device for a seat belt in accordance with the embodiment of the present invention will be described as follows.

The cover 30 may be mounted at the top of the seat 10, and the cushion 50 may be folded and embedded in the cover 30, and the belt webbing part 42 may be exposed to the outside through the cushion 50.

In the above-described state, a passenger may sit on the seat 10, pull the belt webbing part 42, and couple the clip mounted on the belt webbing part 42 to the buckle mounted on the seat 10.

Then, the belt webbing part 42 may support the chest of the passenger, and thus restrict the passenger from moving forward when a vehicle collision occurs later.

When the collision sensor senses a vehicle collision, the controller 60 may operate the inflator 20. When the inflator 20 is operated, discharged gas may be supplied to the cushion 50.

Since the gas supplied to the cushion 50 expands the cushion 50, the cushion deployment part 52 embedded in the cover 30 may be deployed and discharged to the outside of the cover 30, and cover the belt webbing part 42.

When the cushion deployment part 52 is exposed to the outside from the cover 30 and covers the belt webbing part 42, the controller 60 may operate the belt adjusting part 43. When the belt adjusting part 43 is operated, the belt webbing part 42 may be wound to restrict the passenger from moving forward. At this time, the cushion deployment part 52 may be disposed between the belt webbing part 42 and the passenger, thereby preventing an injury of the passenger which may be caused by the belt webbing part 42.

In the airbag device 1 for a seat belt in accordance with the embodiment of the present invention, the cushion 50 may be deployed to cover the belt 40, thereby preventing an injury of the passenger which may be caused by the belt 40 when a vehicle collision occurs.

In the airbag device 1 for a seat belt in accordance with the embodiment of the present invention, the cover induction part 32 may protrude forward and induce the cushion 50 to deploy straight.

In the airbag device 1 for a seat belt in accordance with the embodiment of the present invention, when the inflator 20 is operated to completely deploy the cushion deployment part 52, the belt adjusting part 43 may be operated so that the belt webbing part 42 pressurizes a passenger.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An airbag device for a seat belt, comprising:
    a seat configured to support a passenger, the seat including a seat frame and a seat cushion;
    an inflator embedded in the seat frame;
    a cover mounted on the seat frame and facing an exterior direction, the cover including:
        a cover coupling part coupled to and extending upwardly from a top of the seat frame, the cover coupling part having a first height; and
        a cover induction part extending from the cover coupling part at a second height lower than the first height, and having the cushion embedded therein;
    a belt passing through the cover to enable the belt to cover the passenger; and
    a cushion stored in the cover, and configured to be deployed by gas supplied from the inflator to cover the belt.

2. The airbag device of claim 1, wherein the cover induction part has a duct shape to protrude forward, and is configured to induce the cushion to deploy straight.

3. The airbag device of claim 1, wherein the belt comprises:
    a belt guide part disposed in the cover;
    a belt webbing part passing through the belt guide part and configured to cover the passenger; and
    a belt adjusting part configured to wind or to unwind the belt webbing part.

4. The airbag device of claim 3, wherein the cushion comprises:
    a cushion base part embedded in the cover, and coupled to the inflator; and
    a cushion deployment part coupled to the cushion base part, and covering the belt webbing part to be expanded and deployed by gas supplied from the inflator.

5. The airbag device of claim 4, wherein the cushion deployment part comprises:
    a deployment top surface part connecting with the cushion base part, and covering a top surface of the belt webbing part;
    a deployment bottom surface part connecting with the cushion base part, and covering a bottom surface of the belt webbing part; and
    a deployment side surface part connecting the deployment top surface part and the deployment bottom surface part, and covering a side surface of the belt webbing part.

6. The airbag device of claim 4, wherein after the cushion deployment part is configured to be deployed by the inflator, the belt adjusting part is configured to be driven to wind the belt webbing part.

* * * * *